(12) United States Patent
Suzaki et al.

(10) Patent No.: US 8,100,464 B2
(45) Date of Patent: Jan. 24, 2012

(54) VEHICLE SUBSTRUCTURE

(75) Inventors: Takahiro Suzaki, Toyota (JP); Junichi Uto, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/057,601

(22) PCT Filed: Dec. 1, 2009

(86) PCT No.: PCT/JP2009/070176
§ 371 (c)(1),
(2), (4) Date: Feb. 4, 2011

(87) PCT Pub. No.: WO2011/067826
PCT Pub. Date: Jun. 9, 2011

(65) Prior Publication Data
US 2011/0215615 A1 Sep. 8, 2011

(51) Int. Cl.
*B60J 7/00* (2006.01)
(52) U.S. Cl. ............. 296/193.06; 296/24.4; 296/193.07; 296/187.12
(58) Field of Classification Search ............. 296/193.06, 296/193.07, 187.12, 24.4, 24.41, 24.42, 24.43, 296/24.45, 24.46
See application file for complete search history.

(56) References Cited

U.S. PATENT DOCUMENTS 7,677,645 B2 * 3/2010 Henkelmann ............ 296/187.12
7,806,452 B2 * 10/2010 Storer et al. ............... 296/24.43

FOREIGN PATENT DOCUMENTS

| JP | 7 81626 | 3/1995 |
| JP | 2009 035118 | 2/2009 |
| JP | 2009 190696 | 8/2009 |

OTHER PUBLICATIONS

International Search Report issued Feb. 23, 2010 in PCT/JP09/070176 filed Dec. 1, 2009.

* cited by examiner

*Primary Examiner* — Joseph Pape
(74) *Attorney, Agent, or Firm* — Oblon, Spivak, McClelland, Maier & Neustadt, L.L.P.

(57) ABSTRACT

A vehicle substructure includes a side member inner that becomes a pillar member, a rear side member, and a side member outer. The vehicle substructure includes, for example, a partition as a load transmitting member that is inserted between the side member inner and the rear side member and comes into contact with the wall surface of the side member outer facing a vehicle compartment. It is preferable that the partition have a laminated structure including members and the like. Further, it is more preferable that the vehicle substructure include reinforcing members.

6 Claims, 2 Drawing Sheets

VEHICLE SUBSTRUCTURE

TECHNICAL FIELD

The present invention relates to a vehicle substructure, and more particularly, to a substructure of a side portion of a vehicle.

BACKGROUND ART

A side structure disclosed in Patent Literature 1 is known as a side structure of a vehicle body that appropriately controls the deformation of the vehicle body when a collision occurs from the side surface of a vehicle. In the structure disclosed in this literature, basically, an outer end of a room partition panel is joined to a side member inner; a striker retainer is joined to a side member outer; and a rear member, which is laid inside in the vehicle width direction by a cross member, is connected to the rear portion of a B pillar. According to this structure, a collision load generated at the time of a lateral collision is transmitted from the striker retainer to the room partition, the rear member, or the cross member through the forward wall of the side member outer or that of the side member inner. Accordingly, internal deformation in the vehicle width direction is suppressed.

CITATION LIST

Patent Literature

[Patent Literature 1] Japanese Unexamined Patent Application Publication No. 2009-35118

SUMMARY OF INVENTION

Technical Problem

However, according to this structure, a lateral collision load, which is applied to the striker retainer, is required to be transmitted to the side member inner from the side member outer. Accordingly, if these portions are fractured before the transmission of a load, it is not possible to sufficiently transmit a load to the room partition or the rear member and the cross member. The strength of a component needs to be increased to prevent fracture before the transmission of a load, which causes the increase of the weight of the vehicle structure.

It is an object of the present invention to provide a vehicle substructure in which the transmission efficiency of a lateral collision load is improved.

Solution to Problem

In order to achieve the above-mentioned object, a vehicle substructure according to the present invention includes a pillar member, a rear side member, and a side member outer. The vehicle substructure includes a load transmitting member that is inserted between the pillar member and the rear side member and comes into contact with a wall surface of the side member outer facing a vehicle compartment.

The load transmitting member may be a partition of the vehicle compartment. Further, the partition may have a laminated structure that is laminated in a direction substantially perpendicular to a surface of the partition coming into contact with the side member outer. Furthermore, an inserted portion of the partition is formed to be thinner than a portion of the partition that is positioned closer to the vehicle compartment.

The vehicle substructure may further include a first reinforcing member that is connected to both the partition and the side member outer and reinforces a contact portion where the partition and the side member outer come into contact with each other. The vehicle substructure may further include a second reinforcing member that is connected to both the partition and the rear side member and reinforces a contact portion where the partition and the rear side member come into contact with each other.

Advantageous Effects of Invention

Since a load transmitting member is inserted between the pillar member and the rear side member and comes into contact with a wall surface of the side member outer facing the vehicle compartment, it may be possible to quickly and reliably transmit a collision load, which is applied to the side member outer, to the load transmitting member. Particularly, since a load can be transmitted through the load transmitting member before the collapse of a hollow portion that is formed by the pillar member, the rear side member, and the side member outer, the strength of a closed cross-section that is formed by these may be reliably secured.

Since the load transmitting member is a partition of the vehicle compartment, it may be possible to transmit a load to the rear member or a rear cross through the partition. Accordingly, it is preferable that the load transmitting member be the partition of the vehicle compartment. Since the partition has a laminated structure, the transmission efficiency of a load is improved. Since the inserted portion is formed to be thin, it may be possible to prevent the partition section from remaining without collapsing when the hollow portion collapses to absorb an impact.

Since the first or second reinforcing member is provided, the separation of the partition from the rear side member or the side member outer is suppressed at the time of a collision and a load is reliably transmitted.

DESCRIPTION OF EMBODIMENTS

Figure 1:
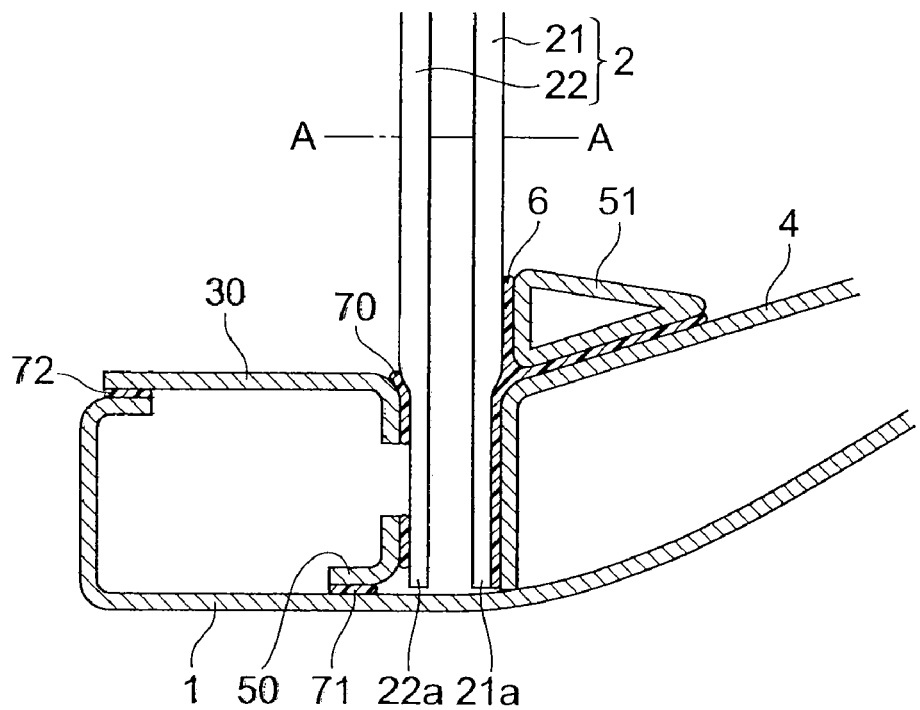
FIG. 1 is a cross-sectional view of a vehicle substructure according to the present invention.

A preferred embodiment of the invention will be described in detail below with reference to accompanying drawings. To facilitate understanding of the description, the same components shown in the respective drawings are denoted by the same reference numerals as far as possible, and the repeated description will be omitted.

FIG. 1 shows a vehicle substructure according to the present invention. FIG. 1 is a cross-sectional view of a substructure taken along a vehicle width direction. In FIG. 1, the lower side corresponds to the outside of a vehicle, the upper side corresponds to a vehicle compartment side, the left side corresponds to the front side of the vehicle, and the right side corresponds to the rear side of the vehicle. The substructure includes a side member outer 1, a side member inner 30 (which corresponds to a B-pillar member), a rear side member 4, and a partition 2, as basic components. Each of the components is made of, for example, carbon fiber reinforced plastics (CFRP).

Next, the substructure will be specifically described. In the cross-section shown in FIG. 1, an end portion of the side member outer 1 corresponding to the front side of a vehicle is bent inward, the side member inner 30 is disposed so as to close the bent portion of the side member outer from the vehicle compartment, and the side member outer and the side member inner are connected to each other by an adhesive layer 72. Further, the rear side member 4 is disposed on the rear side of the side member inner 30 so as to face the vehicle compartment. An end portion of the rear side member 4 corresponding to the front side of the vehicle is bent toward the outside of the vehicle compartment, and the end of the end portion of the rear side member comes into contact with the wall surface of the side member outer 1 facing the vehicle compartment.

Figure 2:
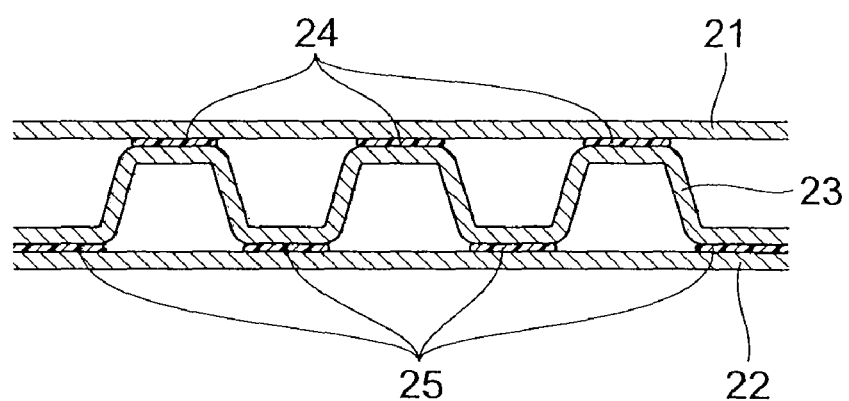
FIG. 2 is a cross-sectional view taken along a line A-A of FIG. 1.

The partition 2 is inserted between the side member inner 30 and the rear side member 4, and is joined to the rear side member 4 and the side member inner 30 by adhesive layers 6 and 70, respectively. Here, the end of the partition 2 comes into contact with the wall surface of the side member outer 1 facing the vehicle compartment. In the partition 2, as shown in FIG. 2, a corrugated plate 23 of which the cross-section has a shape similar to the substantially rectangular waveform shape is interposed between two plate-like members 21 and 22, and contact surfaces are fixed by adhesive layers 24 and 25. Further, portions of the plate-like members 21 and 22, which are inserted between the side member inner 30 and the rear side member 4, are formed to be thinner than portions of the plate-like members that are positioned closer to the vehicle compartment than the portions inserted between the side member inner and the rear side member. That is, a portion (22*a*), which is positioned between the wall surface of the side member inner 30 facing the vehicle compartment and the wall surface of the side member outer 1 facing the vehicle compartment, is formed to be thinner than a portion of the plate-like member 21 that is positioned closer to the vehicle compartment than the portions inserted between the side member inner and the rear side member. Similarly, a portion (21*a*), which is positioned between the wall surface of the rear side member 4 facing the vehicle compartment and the wall surface of the side member outer 1 facing the vehicle compartment, is formed to be thinner than a portion of the plate-like member 22 that is positioned closer to the vehicle compartment than the portions inserted between the side member inner and the rear side member.

In addition to these, a first reinforcing member 50, which has a substantially L shaped cross-section, is disposed at a contact portion where the side member outer 1 comes into contact with the member 22 of the partition 2. The first reinforcing member 50 is connected to both the side member outer 1 and the member 22 by an adhesive layer 71. Further, a prismatic second reinforcing member 51, which has a triangular cross-section, is disposed at a portion, which is close to the vehicle compartment, of a contact portion where the rear side member 4 comes into contact with the member 21 of the partition 2. The second reinforcing member 51 is connected to both the rear side member 4 and the member 21 by the above-mentioned adhesive layer 6.

According to this structure, a closed cross-section (front closed cross-section) is formed in the vehicle compartment on the front side of the partition 2 by the side member outer 1, the side member inner 30, the member 22, and the first reinforcing member 50. Meanwhile, a closed cross-section (rear closed cross-section) is formed in the vehicle compartment on the rear side of the partition 2 by the side member outer 1, the rear side member 4, and the member 21, and the second reinforcing member 51 having a closed cross-section therein is disposed in the vehicle compartment on the rear side of the partition 2.

According to the present invention, first, the partition 2 has the above-mentioned laminated structure. Accordingly, it may be possible to make the partition 2 light, to improve the strength of the partition, and to efficiently transmit a collision load at the time of a lateral collision. Further, the partition 2 is inserted into the closed cross-sectional structure that is formed by the side member outer 1, the side member inner 30, and the rear side member 4, and comes into contact with the inner wall of the side member outer 1 (the wall surface of the side member outer facing the vehicle compartment). Accordingly, the partition can quickly transmit an impact, which is applied to the side member outer 1 at the time of a lateral collision, to the partition 2. Therefore, it may be possible to reduce the amount of deformation of the vehicle.

Furthermore, since the inserted portion of the partition 2 is formed to be thinner than the other portion of the partition except for the inserted portion, difference in strength is set between the inserted portion and the other portion of the partition. Accordingly, if a side member section (a closed cross-sectional portion formed by the side member outer 1, the side member inner 30, and the rear side member 4) including the partition 2 is crushed prior to a partition section (the partition 2 except for the side member section, that is, a portion of the partition 2 facing the vehicle compartment) by a collision load at the time of a lateral collision, it may be possible to suppress the deformation of the vehicle compartment while efficiently absorbing a collision load.

In addition, since the first reinforcing member 50 is provided, stress caused by a collision load is dispersed to the front closed cross-section and the strength of the closed cross-section is secured. Accordingly, the closed cross-section is quickly fractured on early collision, so that a collision load is concentrated on the contact portion where the side member outer 1 comes into contact with the partition 2. As a result, it may be possible to effectively suppress the breakage of the side member outer 1.

Since the second reinforcing member 51 and the rear side member 4 are joined to the member 22 of the partition 2 over a wide range, it may be possible to secure a state where the rear side member 4 and the partition 2 are joined to each other and to suppress the separation between the rear side member and the partition even after the side member section is crushed by a collision load at the time of a lateral collision. Further, it may be possible to secure the torsional stiffness of a vehicle and to suppress the separation of the rear side member 4 from the partition 2 or the floor at the time of breakage.

When CFRP is applied to the vehicle body substructure and each of the members is joined by adhesion, a closed cross-sectional structure collapses due to adhesion and separation at the time of a lateral collision in the structure in the related art. For this reason, a load could not be sufficiently transmitted to the partition or various rear members. According to the invention, it may be possible to efficiently transmit a collision load to the partition even when the collision load is applied. Accordingly, it may be possible to suppress the deformation of a vehicle compartment, to make the structure of a vehicle body appropriate, and to facilitate the reduction of the weight of the vehicle body.

The structure according to the invention is particularly suitable for a vehicle structure where CFRP is used for the side member section as described above. However, the structure according to the invention is not limited thereto. Here, an example where the partition is used as a load transmitting member has been described. However, other structural members except for the partition may be used as the load transmitting member.

REFERENCE SIGNS LIST

1: SIDE MEMBER OUTER, 2: PARTITION, 4: REAR SIDE MEMBER, 6, 24, 25, 71, AND 72: ADHESIVE LAYER, 21, 22: MEMBER, 23: CORRUGATED PLATE, 30: SIDE MEMBER INNER, 50: FIRST REINFORCING MEMBER, and 51: SECOND REINFORCING MEMBER.

The invention claimed is:

1. A vehicle substructure that includes a pillar member, a rear side member, and a side member outer, comprising:
a load transmitting member that is inserted between the pillar member and the rear side member and comes into contact with a wall surface of the side member outer facing a vehicle compartment.

2. The vehicle substructure according to claim 1, wherein the load transmitting member is a partition of the vehicle compartment.

3. The vehicle substructure according to claim 2, wherein the partition has a laminated structure that is laminated in a direction substantially perpendicular to a surface of the partition coming into contact with the side member outer.

4. The vehicle substructure according to claim 2, wherein an inserted portion of the partition is formed to be thinner than a portion of the partition that is positioned closer to the vehicle compartment.

5. The vehicle substructure according to claim 2, further comprising:
a first reinforcing member that is connected to both the partition and the side member outer and reinforces a contact portion where the partition and the side member outer come into contact with each other.

6. The vehicle substructure according to claim 2, further comprising:
a second reinforcing member that is connected to both the partition and the rear side member and reinforces a contact portion where the partition and the rear side member come into contact with each other.

* * * * *